(12) United States Patent
Kruegler

(10) Patent No.: US 6,713,413 B2
(45) Date of Patent: Mar. 30, 2004

(54) NONWOVEN BUFFING OR POLISHING MATERIAL HAVING INCREASED STRENGTH AND DIMENSIONAL STABILITY

(75) Inventor: Gerald F. Kruegler, Clifton Park, NY (US)

(73) Assignee: Freudenberg Nonwovens Limited Partnership, Durham, NC (US)

( * ) Notice: Subject to any disclaimer, the term of this patent is extended or adjusted under 35 U.S.C. 154(b) by 135 days.

(21) Appl. No.: 09/745,816

(22) Filed: Dec. 22, 2000

(65) Prior Publication Data

US 2001/0044006 A1 Nov. 22, 2001

Related U.S. Application Data

(60) Provisional application No. 60/174,295, filed on Jan. 3, 2000.

(51) Int. Cl.⁷ .............................. B32B 5/06; B32B 5/08; B32B 5/26; B32B 7/08

(52) U.S. Cl. ................. 442/272; 442/270; 442/271; 442/274; 442/275; 442/277; 442/278; 442/387; 442/388; 442/389; 442/402; 442/403; 442/405; 442/415; 15/209.1; 15/229.11; 15/256.5

(58) Field of Search ................ 442/268, 270–272, 442/274–278, 281, 321, 324, 381–393, 394–399, 402, 403, 405, 407, 409, 411, 415; 15/208–210.7, 223, 226, 229.11–229.13, 230.17, 231, 256.5–256.6

(56) References Cited

U.S. PATENT DOCUMENTS

| | | | |
|---|---|---|---|
| 3,537,121 A | 11/1970 | McAvoy | 15/230.12 |
| 3,615,990 A | 10/1971 | Butler et al. | 156/148 |
| 3,822,517 A | 7/1974 | Moss | 51/394 |
| 3,991,526 A | 11/1976 | Frank et al. | 51/358 |
| 4,154,889 A | 5/1979 | Platt | 428/234 |
| 4,342,802 A | 8/1982 | Pickens, Jr. et al. | 428/92 |
| 4,416,936 A | 11/1983 | Erickson et al. | 428/286 |
| 4,446,189 A | 5/1984 | Romanek | 428/152 |
| 4,599,761 A * | 7/1986 | Stahl | 15/230.12 |
| 4,688,309 A | 8/1987 | Cordova et al. | 29/90 R |
| 4,841,684 A | 6/1989 | Hall, Jr. | 51/400 |
| 5,030,496 A | 7/1991 | McGurran | 428/85 |
| 5,282,900 A | 2/1994 | McDonell | 134/2 |
| 5,292,567 A | 3/1994 | Foster | 428/64 |
| 5,307,593 A | 5/1994 | Lucker et al. | 51/281 SF |
| 5,396,737 A | 3/1995 | Englund et al. | 451/28 |
| 5,458,962 A | 10/1995 | Birch | 428/288 |
| 5,482,756 A * | 1/1996 | Berger et al. | 442/281 |
| 5,554,442 A * | 9/1996 | Matsunaga et al. | 428/370 |
| 5,573,844 A | 11/1996 | Donovan et al. | 428/240 |
| 5,605,749 A | 2/1997 | Pike et al. | 442/60 |
| 5,624,729 A | 4/1997 | Cohen et al. | 428/90 |
| 5,804,512 A * | 9/1998 | Lickfield et al. | 442/382 |
| 5,910,471 A | 6/1999 | Christianson et al. | 51/295 |
| 5,962,102 A | 10/1999 | Sheffield et al. | 428/92 |
| 5,989,113 A | 11/1999 | Arnold | 451/532 |
| 6,044,515 A * | 4/2000 | Zygmont | 15/209.1 |

FOREIGN PATENT DOCUMENTS

| | | |
|---|---|---|
| EP | 0 451 944 A2 | 10/1991 |
| EP | 0 888 743 A1 | 1/1999 |

* cited by examiner

*Primary Examiner*—Cheryl A. Juska
*Assistant Examiner*—Jenna-Leigh Befumo
(74) *Attorney, Agent, or Firm*—Weingarten, Schurgin, Gagnebin & Lebovici LLP

(57) ABSTRACT

A buffing or polishing material has a nonwoven fleece layer and a backing layer that adds strength and dimensional stability to the material. The nonwoven fleece layer is a needled blend of natural fibers and synthetic fibers having a uniform density and working surface, resulting in a better polishing or finishing consistency. The material can withstand high heat levels and can be worked quickly, resulting in a more efficient polishing or finishing operation. The buff material can be converted into any preferred shape or tool, such as an endless belt, disc, flapwheel, or spiral band.

43 Claims, 1 Drawing Sheet

NONWOVEN BUFFING OR POLISHING MATERIAL HAVING INCREASED STRENGTH AND DIMENSIONAL STABILITY

CROSS REFERENCE TO RELATED APPLICATIONS

This application claims the benefit under 35 U.S.C. §119(e) of U.S. Provisional Application No. 60/174,295, filed on Jan. 3, 2000, the disclosure of which is incorporated by reference herein.

STATEMENT REGARDING FEDERALLY SPONSORED RESEARCH OR DEVELOPMENT

N/A

BACKGROUND OF THE INVENTION

The primary way to polish or finish various surfaces is with the use of cotton or cotton blended woven fibers converted into a wheel or bias buff form. Various grades of abrasives and abrasive compounds are applied to this material to achieve the desired finish for the particular application. For many applications, a different piece of equipment and a new buffing or polishing material must be used for the final finishing steps.

In applications that use hook and loop type holders, wool discs are attached to the holder. Either these discs must be tied on to the holder, or a hook and loop type substrate must be sewn or glued onto the back of the wool disc.

SUMMARY OF THE INVENTION

The present invention relates to a buffing or polishing material, also called a buff material, comprising a nonwoven fleece layer of natural and synthetic fibers fastened to a backing that provides strength and dimensional stability to the finished assembly. The nonwoven fleece layer comprises a blend of natural fibers and synthetic fibers ranging between 95% natural fibers and 5% synthetic fibers to 50% natural fibers and 50% synthetic fibers. The synthetic fibers preferably include low-melting polyester fibers that, when heated to their melting temperature, melt and bind with the other fibers of the fleece layer.

The resulting material has a uniform density and a stable construction, making it useful as a polishing or finishing material. The material can be used in various converted forms, such as a disc, endless belt, flapwheel, or spiral band. These converted forms may be used to buff, polish, or finish parts or products made of a variety of materials, such as metal, wood, plastic, composites, and glass. Abrasives or abrasive compounds can be applied to the surface of the material to aid in the buffing, polishing, or finishing operation.

The backing layer and fleece layer are held together by needle punching, by inclusion of a nonwoven fusible layer therebetween, or both. The nonwoven fusible layer also adds strength to the assembly. The backing layer preferably comprises a multi-filament layer and a polyester film layer, although other materials, such as another film material, woven cloth, a nonwoven, a spunbond, scrim, or loop fabric may be provided.

DESCRIPTION OF THE DRAWINGS

The invention will be more fully understood from the following detailed description taken in conjunction with the accompanying drawings in which.

DETAILED DESCRIPTION OF THE INVENTION

Figure 1:
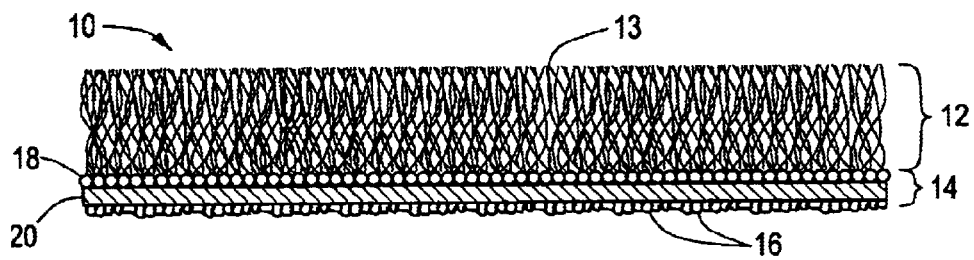
FIG. 1 is a cross section of the buff material of the present invention.

Referring to FIG. 1, the buff material 10 includes a fleece layer 12 attached to a backing 14. The layer 12 is a blend of natural fibers and synthetic fibers. The fibers of the layer 12 are initially needle punched to create a specific density of the fiber combination of the layer 12. The density of the fleece layer 12 ranges from 4.2 to 9.2 lbs/ft$^3$ (0.0676 to 0.148 g/cc), and preferably is 5.2 lbs/ft$^3$ ±10%. Preferably, a portion of the synthetic fibers in the fleece layer comprises a low-melt polyester, and the assembly is heated in an oven to the melting temperature of these polyester fibers to aid in binding the synthetic and natural fibers in the fleece layer together. In the embodiment of FIG. 1, the layer 12 is then placed on the backing 14, and the entire assembly is needle punched or tacked to affix the fleece layer to the backing. In a polishing or finishing operation, the backing 14 is attached to the polishing or finishing equipment. The surface 13 of the layer 12 opposite the backing 14 contacts the working surface to be polished.

Figure 2:
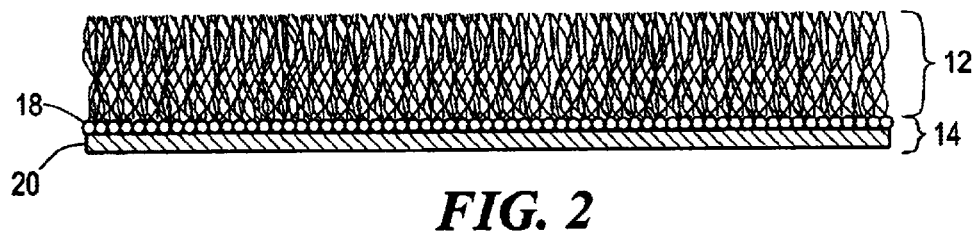
FIG. 2 is a cross section of the buff material during an intermediate manufacturing stage.

As noted above, the layer 12 is needle punched or tacked to the backing 14. In the second needle punching operation, the needled fibers of the layer 12 are pushed through the backing 14, forming loops 16 on the opposite side of the backing, as shown in FIG. 1. FIG. 2 illustrates the material prior to this needle punching operation. The loops 16 serve as loops that can fasten directly to hooks on the polishing or finishing equipment. In this manner, the buff material, typically converted into a disc form, may be used with a hook and loop type holder without the use of an additional fastening member or fastening step.

In the layer 12, the natural fibers may include wool, cotton, hemp, linen, flax, sisal, jute, or other natural fibers. The synthetic fibers may include nylon fibers, aramid fibers such as NOMEX® or KEVLAR®, polyester fibers, or other synthetic fibers. The ratio of natural to synthetic fibers ranges from 95% natural fiber and 5% synthetic fiber by weight to 50% natural fiber and 50% synthetic fiber by weight. Preferably, the ratio is 85% natural fiber to 15% synthetic fiber. The natural fibers serve as the primary polishing agent. The synthetic fibers serve to bind the natural fibers together.

Preferably, the synthetic fibers are a combination of low-melt polyester fibers and other synthetic fibers, such as nylon. The polyester is selected to have a melting temperature lower than the other synthetic and natural fibers in the fleece. For example, many polyester fibers have a melting temperature in the range of 220° F. to 260° F., whereas nylon melts at approximately 550° F. and wool ashes/chars at above 800° F. The low-melt polyester fibers are heated to the melting temperature so that they melt and chemically bond to the natural fibers and the other synthetic fibers. This chemical bonding helps strengthen the fleece and, more significantly, helps prevent pilling or shedding of the fleece on the working surface, which could adversely affect the quality of the finished workpiece. A suitable low-melt polyester is commercially available as CELBOND® from KOSA Corp. of Salisbury, N.C.

The other synthetic fibers add strength and durability. These fibers, as well as the low-melt fibers, mechanically bind the natural fibers together by virtue of their entanglement with the natural fibers resulting from the first needle punching operation. In the preferred embodiment, the fleece layer comprises 85% natural fiber, preferably wool, 10% nylon, and 5% polyester fibers, by weight. The low-melt polyester fibers may range from 0 to 5% in the fleece layer, and the other synthetic fibers may range from 0 to 45% in the fleece layer, by weight.

The backing 14 is preferably a combination of a multi-filament fiber layer 18, such as a polyester tow with fibers oriented in the machine direction, and a polyester film layer 20 such as MYLAR®. The backing imparts strength and dimensional stability to the buff material. The fleece blend in layer 12 is, by itself, subject to stretching, whereas the polyester film layer 20 of the backing 14 is not stretchable. By fixing the fleece blend layer 12 to the backing 14, undesirable stretching of the fleece blend is prevented. A polyester film layer 20 of MYLAR® is strong in a first direction, typically across the web, but is subject to tearing along a direction normal to the first direction, the machine direction. The multi-filament layer 18 imparts strength to the backing layer 14 in the machine direction. The multi-filament layer 18 also prevents tearing of the MYLAR® polyester film layer 20 in the machine direction or minimizes the effect of such tearing of the polyester film layer if it occurs. In an alternative embodiment, the backing 14 may be formed of other materials, such as a film of another material, a nonwoven, a spunbond, a woven cloth, scrim, or a loop fabric that can impart to the finished buff material the characteristics of strength and dimensional stability.

The thickness of the final buff material typically ranges from 0.17 inch to 0.50 inch (4.3 mm to 12.7 mm) and is preferably 0.30 inch ±10%. The backing layer 14 has a thickness of 1.5 to 10 mils. With each needling operation, the material in the layer 12 compacts or densifies somewhat. The actual final thickness of the buff material may be determined by the intended application. For applications requiring a buff material with a longer life or greater strength, a material with a greater thickness may be chosen. For applications requiring a buff material with more flexibility or conformability, a material with a lesser thickness may be chosen.

Figure 3:
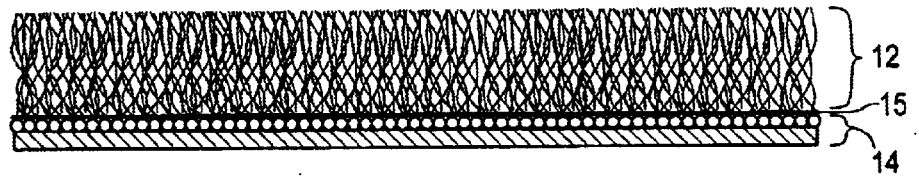
FIG. 3 is a cross section of a further embodiment of the buff material of the present invention.

In a further embodiment of the buff material of the present invention, illustrated in FIG. 3, a layer 15 of a nonwoven fusible material is inserted between the fleece layer 12 and the backing layer 14. The nonwoven fusible material adds additional strength and stability to the buff material, and is accordingly, preferred. However, the presence of the nonwoven fusible layer is not necessary for all applications and this layer may be omitted if desired, for example, to reduce material costs and eliminate manufacturing steps.

The nonwoven fusible layer 15 is inserted between the fleece layer 12 and the backing layer 14. The assembly is heated in an oven to an appropriate temperature for an appropriate time to fuse the fibers of the nonwoven fusible layer to the fleece layer and the backing layer. The heating step that binds the low-melt fibers of the fleece layer may also be used to fuse the fusible material to the fleece layer and the backing layer as well. The temperature and time depends on the particular nonwoven fusible material selected and the amount of natural fiber present in the fleece layer. Nonwoven fusible materials are formed from low melting temperature polyester fibers, and a wide variety are commercially available, such as VILENE® SP-20, available from Freudenberg Nonwovens. Most if not all of the commercially available fusible materials are suitable.

Figure 4:
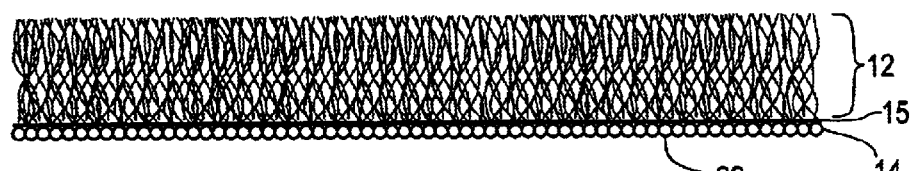
FIG. 4 is a cross section of a still further embodiment of the buff material of the present invention.

A still further embodiment of the present invention is illustrated in FIG. 4. In this embodiment, the backing layer 14 comprises a woven cloth 22 or a scrim, for example, of aramid or natural fibers. A nonwoven fusible layer 15 is interposed between the fleece layer 12 and the backing layer 14. The fleece layer and the backing layer are not needle punched to hold them together. This results in a buff material having a smooth backing surface, which is desirable in certain applications. The woven cloth 22 provides strength and dimensional stability. The fusible layer holds the woven cloth to the fleece layer and provides additional strength and dimensional stability.

The buff material of the present invention was tested using an Instron Corporation standard elongation/tensile testing machine. The following materials were tested:

Fleece A comprising 85% wool and 15% nylon; and

Fleece B comprising 85% wool, 15% nylon, and 5% polyester (CELBOND®).

Backing 1 comprising a cotton/polyester jeans cloth, available as product 213 from Norton Co.;

Backing 2 comprising a 2–10 mil MYLAR® film attached to a 500 denier multi-filament polyester tow;

Backing 3 comprising a 100% polyester cloth 72×50 thread, polyurethane treated;

Backing 4 comprising a cotton/polyester jeans cloth, available from Johnston Industries in Alabama; and Backing 5 comprising a KEVLAR® scrim.

The following tables present data for 1 inch wide and 2 inch wide samples subjected to elongation at 40 pounds per linear inch (PLI), 45 PLI, and to break in the machine direction (MD) and in the cross machine direction (CMD), as noted. Typically in an endless belt apparatus, a buff material is subjected to a tensile force ranging from 25 to 30 PLI, with a maximum of 45 PLI. Most applications use buff material at least 2 inches wide, although some applications use buff material of 1 inch wide.

TABLE 1

|  | Percent Stretch at 40 PLI (MD) | | Max Stress (at break) (PSI) | |
| --- | --- | --- | --- | --- |
|  | Test 1 | Test 2 | Test 1 | Test 2 |
| Fleece A Backing 2 1 in. wide | 1.957 | 2.08 | 388 | 398 |
| Fleece A Backing 2 2 in. wide | .7146 | .9131 | 382.7 | 367.8 |
| Fleece A Backing 5 1 in. wide | 1.026 | 1.735 | 948 | 902 |
| Fleece A Backing 5 2 in. wide | 1.144 | .893 | 810 | 775 |

TABLE 2

|  | Percent Stretch at 45 PLI | | Max Stress (at break) (PSI) | |
| --- | --- | --- | --- | --- |
|  | MD | CMD | MD | CMD |
| Fleece B Backing 1 1 in. wide | 4.019 | 76.556 | 451 | 269 |

TABLE 2-continued

|  | Percent Stretch at 45 PLI | | Max Stress (at break) (PSI) | |
| --- | --- | --- | --- | --- |
|  | MD | CMD | MD | CMD |
| Fleece B Backing 2 1 in. wide | 2.828 | 77.837 | 425 | 282 |
| Fleece B Backing 3 1 in. wide | 10.44 | 88.53 | 598 | 226 |
| Fleece B Backing 4 1 in. wide | 3.468 | 103.428 | 502 | 200 |

TABLE 3

|  | Percent Stretch at 40 PLI (MD) | |
| --- | --- | --- |
|  | Test 1 | Test 2 |
| Fleece B Backing 2 1 in. wide | 1.957 | 2.08 |
| Fleece B Backing 2 2 in. wide | .7146 | .9131 |
| Fleece B Backing 5 1 in. wide | 1.026 | 1.735 |
| Fleece B Backing 5 2 in. wide | 1.144 | .8933 |

Preferably, for endless belt applications in which the buff material should not stretch excessively, the break strength is as much as 425 PLI, and the elongation at break is no more 2%. The break strength may be less and the elongation greater than this, depending on the application.

The buff material of the present invention can be converted into any preferred shape or tool in any desired size or style, such as an endless belt, disc, flapwheel, spiral band, or mechanically fastened disc such as with buttons or screws. The material can be fashioned into an endless belt using a conventional abrasive belt joint technology, such as the Composite Material Corp., Watervliet, N.Y., belt joint procedure. The converted shape or tool may be used with existing polishing or finishing equipment. The material can be used for all polishing and finishing operations on a single surface to be polished. Thus, a user does not need to change equipment or polishing material to finish the polishing operation. This is a particularly advantageous feature in the belt form. In many prior art polishing applications using an endless belt polisher, the user must switch to different finishing equipment and use a new buff material for the fine finishing work.

Due to the precision needling to achieve the desired uniform density of the fleece, the working surface of the fleece is very uniform, resulting in better polishing or finishing consistency, in contrast to natural buffing materials, such as wool. Also, the inclusion of natural fibers, such as wool, blended with the synthetic fibers, allows the complete fleece to absorb, hold, and retain polishing or finishing compounds and liquids better than a fleece formed entirely of synthetic fibers.

The natural and synthetic fiber blend in the fleece layer 12 allows the converted product to be used at a higher working surface heat level, producing more desirable finishes. Most synthetic fibers or fiber blends, such as nylon or polyester, when subjected to higher levels of heat, impart an undesirable smear or residue onto the working surface, because the melting temperature of the synthetic material is too low for the heat levels at the working surface. For example, polyesters have melting temperatures up to about 480° F. and natural fibers have melting temperatures of 550° F. or higher, or do not melt at all, but char or ash. Wool and most natural fibers have char/ash temperatures well in excess of 800° F., which is sufficiently high to withstand the heat levels at the working surface without melting. With the blend of natural and synthetic fibers in the range of the present invention, the natural fibers serve as an insulation for the buff material, so that the temperature within the buff material does not exceed the melting temperature of the synthetic fibers. Thus, the synthetic fibers do not melt and apply an undesirable residue to the surface to be polished. Additionally, more pressure can be applied and the buff material can be worked more quickly, resulting in a more efficient polishing or finishing operation.

The buff material can be used, alone or with various compounds, to polish, buff, finish, and/or deburr various surfaces of glass, plastic, wood, composites, metals, and other surfaces, as would be known in the art. The buff material can be used with abrasive compounds, polishing compounds, or in its natural state with no additional compounds to aid in the polishing or finishing, depending on the application. The buff material can also be cleaned for reuse with other compounds. The natural fibers are environmentally friendly and absorb and hold abrasive compounds better and longer than synthetic fibers.

In belt or disc form, the buff material can be used in several applications. With a loop type backing, the material can be used with disc systems that have a loop material that receives hooks. The composite backing eliminates stretching in the belt form. The needling of the fleece fibers together results in more uniform polishing and finishing.

The buff material of the present invention may be used in a variety of applications. For example, the material can be used to polish fine and costume jewelry, building hardware such as door hinges, leather goods, titanium joint implants, knives, surgical instruments, pharmaceutical tubing and valves, musical instruments, pewter ware, most metals before plating, and natural post-sanded stone such as granite. Rubber and plastic parts can be deflashed without scratching. The material can be used in cut and color buffing of metals. The material is able to produce a bright grain surface on stainless steel, such as for food service equipment. It can be used for the final polishing of wood furniture after lacquer or a polyurethane coating. It can be used for polishing boat or automotive finishes using the appropriate polishing compounds or with auto repair compounds on paint repair. The material can produce a high gloss finish on a boat propeller. It can be used for centerless outer diameter tube polishing for surgical or stainless steel tubing. It can be used for glass edge polishing with a water based abrasive system. It should be noted that the terms buffing, polishing, and finishing may have various meanings, depending on the particular application or industry in which the term is used.

The invention is not to be limited by what has been particularly shown and described, except as indicated by the appended claims.

What is claimed is:

1. A buffing or polishing material comprising:
   a nonwoven fleece layer comprising a blend of natural fibers and synthetic fibers, a ratio by weight of natural fibers to synthetic fibers ranging between 95% natural fibers and 5% synthetic fibers to 50% natural fibers and 5% synthetic fibers the natural and synthetic fibers needle punched together;

a backing fixed as a layer to the fleece layer, the backing having a greater strength and a greater dimensional stability than the fleece layer; and a nonwoven fusible layer interposed between the fleece layer and the backing, the fleece layer needle punched to the backing.

2. The material of claim 1, the nonwoven fusible layer further comprising a polyester material.

3. The material of claim 1, wherein the fleece layer forms loops on an outer side of the backing.

4. The material of claim 1, wherein the ratio of natural fibers to synthetic fibers comprises 85% natural fibers and 15% synthetic fibers by weight of the fleece layer.

5. The material of claim 1, wherein the natural fibers of the fleece layer include wool, cotton, hemp, linen, flax, sisal, or jute.

6. The material of claim 1, wherein the synthetic fibers of the fleece layer include nylon, polyester, or aramid fibers.

7. The material of claim 1, wherein at least a portion of the synthetic fibers of the fleece layer include mechanically binding fibers.

8. The material of claim 7, wherein the mechanically binding fibers comprise up to 45% by weight of the fleece layer.

9. The material of claim 1, wherein at least a portion of the synthetic fibers of the fleece layer include chemically binding fibers.

10. The material of claim 9, wherein the chemically binding fibers comprise polyester fibers having a lower melting temperature than a remainder or the synthetic fibers or of the natural fibers.

11. The material of claim 9, wherein the chemically binding fibers comprise up to 5% by weight of the fleece layer.

12. The material of claim 11, wherein a remainder of the synthetic fibers comprises up to 45% by weight of the fleece layer.

13. The material of claim 1, wherein the backing comprises a multi-filament polyester fiber layer and a polyester film layer.

14. The material of claim 1, wherein the backing comprises a nonwoven material, a woven cloth, a film, a spunbond material, a scrim, or a loop fabric.

15. The material of claim 1, wherein the backing has a break strength greater than the fleece layer and an elongation at break lees than the fleece layer.

16. The material of claim 1, wherein the density of the fleece layer 4.2 lb/ft$^3$ to 9.2 lb/ft$^3$.

17. The material of claim 1, wherein the material has a break strength of at least 425 pounds per linear inch in the machine direction.

18. The material of claim 1, wherein the material has an elongation at break of no more than 2%.

19. The material of claim 1, wherein the material has a thickness between 0.17 inch to 0.50 inch.

20. The material of claim 1, wherein the backing is configured to fasten to a polishing, buffing, or finishing tool.

21. The material of claim 1, wherein the material is in the form of a disc, an endless belt, a flapwheel, or a spiral band.

22. A buffing or polishing material comprising:

a nonwoven fleece layer comprising a blend of natural fibers and synthetic fibers;

a backing fixed to the fleece layer, the backing having a greater strength and a greater dimensional stability than the fleece layer; and a nonwoven fusible layer interposed between the fleece layer and the backing, the fleece layer needle punched to the backing;

wherein the material has a break strength of at least 425 pounds per linear inch in the machine direction and an elongation at break of no more than 2%.

23. A buffing or polishing material comprising:

a nonwoven fleece layer comprising a blend of natural fibers and synthetic fibers, the synthetic fibers comprising no more than 50% by weight of a ratio of natural fibers to synthetic fibers;

at least a portion of the synthetic fibers including fibers chemically bound to others of the synthetic fibers and the natural fibers;

the natural fibers and the synthetic fibers needle punched together;

a backing fixed as a layer to the fleece layer, the backing having a greater strength and a greater dimensional stability than the fleece layer;

wherein the fleece layer is needle punched to the backing; and a nonwoven fusible layer interposed between the fleece layer and the backing.

24. The material of claim 23, the nonwoven fusible layer further comprising a polyester material.

25. The material of claim 23, wherein the fleece layer forms loops on an outer side of the backing.

26. The material of claim 23, wherein the ratio of natural fibers to synthetic fibers comprises 85% natural fibers and 15% synthetic fibers by weight of the fleece layer.

27. The material of claim 23, wherein the natural fibers of the fleece layer include wool, cotton, hemp, linen, flax, sisal, or jute.

28. The material of claim 23, wherein the synthetic fibers of the fleece layer include nylon, polyester, or aramid fibers.

29. The material of claim 23, wherein at least a portion of the synthetic fibers of the fleece layer include mechanically binding fibers.

30. The material of claim 29, wherein the mechanically binding fibers comprise up to 45% by weight of the fleece layer.

31. The material of claim 23, wherein at least a portion of the synthetic fibers of the fleece layer include chemically binding fibers.

32. The material of claim 31, wherein the chemically binding fibers comprise polyester fibers having a lower melting temperature than a remainder of the synthetic fibers or of the natural fibers.

33. The material of claim 31, wherein the chemically binding fibers comprise up to 5% by weight of the fleece layer.

34. The material of claim 33, wherein a remainder of the synthetic fibers comprises up to 45% by weight of the fleece layer.

35. The material of claim 23, wherein the backing comprises a multi-filament polyester fiber layer and a polyester film layer.

36. The material of claim 23, wherein the backing comprises a nonwoven material, a woven cloth, a film, a spunbond material, a scrim, or a loop fabric.

37. The material of claim 23, wherein the backing has a break strength greater than the fleece layer and an elongation at break less than the fleece layer.

38. The material of claim 23, wherein the density of the fleece layer is 4.2 lb/ft$^3$ to 9.2 lb/ft$^3$.

39. The material of claim 23, wherein the material has a break strength of at least 425 pounds per linear inch in the machine direction.

40. The method of claim 23, wherein the material has an elongation at break of no more than 2%.

41. The material of claim 23, wherein the material has a thickness between 0.17 inch to 0.50 inch.

42. The material of claim 23, wherein the backing is configured to fasten to a polishing, buffing, or finishing tool.

43. The material of claim 23, wherein the material is in the form of a disc, an endless belt, a flapwheel, or a spiral band.

* * * * *

UNITED STATES PATENT AND TRADEMARK OFFICE
CERTIFICATE OF CORRECTION

| | |
|---|---|
| PATENT NO. | : 6,713,413 B2 |
| APPLICATION NO. | : 09/745816 |
| DATED | : March 30, 2004 |
| INVENTOR(S) | : Gerald F. Kruegler |

It is certified that error appears in the above-identified patent and that said Letters Patent is hereby corrected as shown below:

Column 6, line 67, "5% synthetic fibers" should read --50% synthetic fibers--.

Signed and Sealed this

Twenty-second Day of August, 2006

JON W. DUDAS
*Director of the United States Patent and Trademark Office*